(12) United States Patent
Zhang et al.

(10) Patent No.: US 6,215,556 B1
(45) Date of Patent: Apr. 10, 2001

(54) PROCESS AND DEVICE FOR MEASURING THE THICKNESS OF A TRANSPARENT MATERIAL USING A MODULATED FREQUENCY LIGHT SOURCE

(75) Inventors: Jingwei Zhang, Antony; Pascal Grente, Courbevoie, both of (FR)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/346,708

(22) Filed: Jul. 2, 1999

(30) Foreign Application Priority Data

Jul. 3, 1998 (FR) .................................................. 98 08473

(51) Int. Cl.[7] .............................. G01B 11/02; G01B 9/02; G01N 21/00
(52) U.S. Cl. ........................ 356/503; 356/485; 356/239.1
(58) Field of Search .................................... 356/357, 381, 356/239.1

(56) References Cited

U.S. PATENT DOCUMENTS

| | | | |
|---|---|---|---|
| 3,720,421 | * 3/1973 | Kasahara et al. | 356/108 |
| 3,736,065 | * 5/1973 | Cushing et al. | 356/239 |
| 4,254,337 | 3/1981 | Yasujima et al. . | |
| 4,958,930 | * 9/1990 | Robertson, Jr. | 356/357 |
| 5,657,124 | 8/1997 | Zhang et al. . | |
| 6,067,161 | * 5/2000 | Marcus et al. | 356/357 |

FOREIGN PATENT DOCUMENTS

| | | |
|---|---|---|
| 2 435 019 | 8/1979 | (FR) . |
| WO 95/22740 | 8/1995 | (WO) . |

* cited by examiner

*Primary Examiner*—Frank G. Font
*Assistant Examiner*—Phil Natividad
(74) *Attorney, Agent, or Firm*—Pennie & Edmonds LLP

(57) ABSTRACT

The invention relates to a process and to a device for measuring the thickness of transparent materials. More particularly, but not exclusively, the invention concerns the thickness measurement of glass materials and, even more precisely, the thickness measurement of flat glass, in particular float glass. According to the invention, a light beam with modulated frequency is focused, two light beams or rays reflected by each of the surfaces of the transparent material are received, interference is created between them, the number of oscillations per modulation period of the interference signal is determined, the path difference ($\delta$) between the two beams and the thickness (e) of the transparent material are deduced and the phase shift ($\phi$) of the said interference signal is determined. This determination of the phase-shift between the two signals each coming from one of the surfaces of the transparent material can then be used to deduce other characteristics of the said material. It may in particular be applied to the precise measurement of local thickness variations, in particular of a strip of float glass. Similarly, it is proposed to apply it to measuring the thickness of a thin transparent material, preferably more than 0.2 mm.

14 Claims, 8 Drawing Sheets

PROCESS AND DEVICE FOR MEASURING THE THICKNESS OF A TRANSPARENT MATERIAL USING A MODULATED FREQUENCY LIGHT SOURCE

BACKGROUND OF THE INVENTION

The invention relates to a process and to a device for measuring the thickness of transparent materials. More particularly, but not exclusively, the invention concerns the thickness measurement of glass materials and, even more precisely, the thickness measurement of flat glass, in particular float glass.

The general quality requirements demanded by customers and the savings which can be made by keeping to the bottom of the thickness tolerance range require very rigorous monitoring of thickness in the mass production of flat glass.

Of the techniques normally used for measuring thickness, the most precise methods which can be used in transparent media are optical methods. Among these, interferometric techniques, previously limited to laboratory measurements, have progressively found industrial applications.

For example, document FR-A-2 435 019 proposes a technique for measuring the thickness of a thin film which consists in exposing the thin film to infrared light spectroscopically split by rapid scanning over a range of wavelengths which is predetermined as a function of the nature of the film so as to create a spectrum of interference fringes between the reflected rays, the extreme points of which are determined. The technique is limited to thicknesses necessarily smaller than 30 $\mu$m. It consists in counting the interference fringes of rays reflected by the surfaces of the film. Such a method cannot be used for measuring the thickness of flat glass on a float glass production line whose thickness varies from less than 1 mm to 2 cm.

Another document, WO 95/22740, describes an interference method for determining the wall thickness of bottles during their manufacture.

The process is characterized in that a light beam with modulated optical frequency is emitted, in that two light beams or rays, reflected by each of the surfaces of a wall of a material, are received, in that interference is created between them and in that the path difference $\delta$ of the interference signal is determined. A laser diode is used as the illumination source, and this is modulated by modulation of the optical frequency of the beam. Of the rays scattered by the two walls, two parallel rays are selected. The device of the invention makes it possible to take measurements 0.3 msec apart on each sensor. It is thus possible to explore every millimetre of the periphery of a bottle in rotation.

This technique, in which measurements are taken using isolated rays scattered by the surfaces, requires relatively powerful lasers (>30 mW), which may present drawbacks. It will be difficult to use the same method with parallel reflected beams because of the prismaticity of the support and, in particular, of float glass which is always prismatic in the edge zones.

Although providing good precision on the absolute thickness measurement, the method of WO 95/22740 is less well suited to following local thickness variations. This type of measurement is, however, very important for detecting the drifts in the nominal thickness of flat glass on its production line as early as possible. Furthermore, the method of WO 95/22740 does not make it possible to measure thicknesses smaller than 0.7 mm.

SUMMARY OF THE INVENTION

The object of the invention to which the present patent application relates is to develop the techniques above while improving their performance.

The invention proposes a process for measuring the thickness (e) of a transparent material with refractive index (n), in which a light beam with modulated optical frequency is focused, where two light beams or rays, reflected by each of the surfaces of the transparent material, are received, where interference between them is created, where the number of oscillations per modulation period of the interference signal is determined and where the path difference ($\delta$) between the two beams and the thickness (e) of the transparent material are deduced, and in which the phase shift ($\Delta\phi$) of the said interference signal is also determined.

This determination of the phase shift between the two signals recorded in succession can then be used to deduce other characteristics of the said material. It may in particular be applied to the precise measurement of local thickness variations, in particular of a strip of float glass. Similarly, it is proposed to apply it to measuring the thickness of a thin transparent material, preferably more than 0.2 mm.

The process of the invention is characterized in that the light beam with modulated optical frequency is emitted by a laser diode with distributed Bragg reflector (DBR).

Another characteristic is that the beams reflected by the surfaces of the transparent material are received after specular reflection and, lastly, another is that the focused light beam converges before reaching the surfaces of the transparent material so that it is divergent at the surfaces of the said transparent material which it reaches.

All these characteristics, taken in isolation or as a group, make it possible to obtain the local thickness variations by receiving the interference signal on a detector followed by:

digitizing the signal if necessary;

obtaining the ratio of the interference signal to the modulation of the intensity;

band-pass filtering the ratio;

determining the extrema of the resultant signal for the measurement at time k;

determining the time between the corresponding extrema of two successive measurements (k and k+1);

calculating the ratio of the preceding time to the corresponding period and multiplying it by 2 $\pi$ to obtain the phase shift $\Delta\phi$;

calculating the thickness variation by the formula:

$$\Delta e = \frac{\lambda_0 \cdot \Delta\varphi}{4n\pi}$$

with:

$\lambda_0$=wavelength of a laser diode without modulation, $\Delta\phi$=phase shift, n=refractive index.

By virtue of this method of evaluating the thickness variations, the process of the invention makes it possible to monitor them with precision better than $1.10^{-8}$ m. Such precision very advantageously makes it possible to measure, for example, dioptric defects of float glass. The dioptric defect is, as is known, mathematically connected with the second derivative of the thickness profile.

The invention also relates to the device intended to implement the process. It has, in particular, a light source with DBR laser diode, means for receiving an interference signal and a computer which successively:

digitizes the signals;

takes the ratio of the interference signal and the intensity modulation;

band-pass filters the digitized ratio;

determines the extrema;

determines the time between the corresponding extrema of two successive measurements (k and k+1);

takes the ratio of the preceding times to the corresponding periods and multiplies it by 2 π to obtain the phase shift;

calculates the thickness variation by the formula:

$$\Delta e = \frac{\lambda_0 \cdot \Delta\varphi}{4n\pi}$$

In one variant, the device has fibre-optic waveguides for transporting the light emitted by the laser diode and/or reflected by the surfaces of the transparent object. This technique makes it possible to work in hostile environments, such as in heat or in dust. It is thus possible to take measurements as soon as the sample to be monitored, for example float glass, leaves its processing device, in particular the float bath.

One variant also has avalanche photodiodes as the reception means.

The figures and the description which follow will make it possible to understand how the invention operates and to appreciate the advantages thereof.

DETAILED DESCRIPTION OF THE INVENTION

During the manufacture of flat glass, it is necessary to measure the thickness profile of the float strip for two reasons: quality control and hot process control.

For quality control, the monitoring of the thickness profile of the float strip is currently carried out on-line (square) using commercial instruments. These operate either by absorption of gamma radiation or by optical means.

Instruments which operate by absorption of gamma radiation certainly do not have a future because instruments using a radioactive source are required to be phased out owing to restrictive national and international regulations.

Instruments which operate by optical means use a geometrical optics method. A laser beam reflected by the glass gives two spots which correspond to the two faces. The distance between these two spots is proportional to the thickness of the glass.

These instruments are unreliable because they are sensitive to the distance from the glass and, above all, to the tilt of the glass. They are also difficult to adjust. The major drawback with these instruments is that they do not have sufficient accuracy, especially for thin and ultra thin glass, that is to say with a thickness less than 0.5 mm.

In order to control the process, it is preferable to install an instrument for hot thickness measurement, that is to say immediately after the float outlet. This will make it possible to monitor the thickness profile immediately after each adjustment in the float, without having to wait for the glass to leave the lehr in order to be able to monitor it. It would thus be possible to obtain better adjustment for the float, so that the thickness profile is flatter and the thickness is at the lower limit of the specification. This would lead to a considerable weight saving.

Hot thickness monitoring will also make it possible to reduce the production losses when changing thickness, especially for thick glass.

It is therefore necessary to develop a sensor capable of measuring the thickness profile when hot as well as when cold, which is reliable, robust, accurate (±0.005 mm) and economical.

It is well known that, at the output of an interferometer illuminated by a monochromatic source, the interference signal received by a photodetector is given by:

$$V_{int} \propto I_0\left(1 + C \cdot \cos\left(\frac{2\pi}{\lambda}\delta\right)\right), \quad (1)$$

the sign indicating "proportional to".

Interference techniques are well known, in particular from the document WO 95/22740 which describes the use of interference when employing a source with modulated optical frequency.

In an interferometer, if the optical frequency or 1/λ can be modulated by linear modulation in the shape of a symmetrical triangle, the following can be written:

$$\frac{1}{\lambda} = \frac{1}{\lambda_0} + g_0(t) \cdot \frac{1}{T/2} \quad (2)$$

Here, $\lambda_0$ denotes the initial laser wavelength without modulation, $g_0(t)$ represents the shape with which 1/λ is modulated as a function of time, denoted by t, and T represents the period of the triangular modulation.

In this case, for a fixed path difference δ, the interference signal varies as a function of the wavelength which is time-modulated. This is a heterodyne interference phenomenon.

Substituting equation (2) into equation (1) gives, for time t, the interference signal during the rise or fall of the signal given by:

$$V_{int} \propto I_o(1 + C \cdot (\varphi_0 + g_1(t))) \quad (3)$$

where:

$$\varphi_0 = \frac{2\pi}{\lambda_0}\delta \quad (3\text{-}1)$$

$$g_1(t) = 2\pi \frac{g_0(t)}{T/2}\delta \quad (3\text{-}2)$$

For a conventional laser diode, on condition that there is no mode jumping, the wavelength is linearly modulated:

$$\frac{1}{\lambda} = \frac{1}{\lambda_0} + \Delta\left(\frac{1}{\lambda}\right) \cdot \frac{t}{T/2} \quad (4)$$

In this case:

$$V_{int} \propto I_0(1 + C \cdot \cos(\varphi_0 + \omega t)) \quad (5)$$

with:

$$\varphi_0 = \frac{2\pi}{\lambda_0}\delta \quad (6\text{-}1)$$

$$\omega = 2\pi \cdot \Delta\left(\frac{1}{\lambda}\right)\frac{\delta}{T/2} \quad (6\text{-}2)$$

From equation (5), it can be seen that when using a conventional laser diode, linear modulation of the optical frequency (or $1/\lambda$) leads to a sinusoidal signal whose angular frequency is $\omega$. During a half-period of the triangular modulation, there are N oscillations:

$$N = \frac{\omega \cdot T/2}{2\pi}$$

which gives:

$$N = \Delta\left(\frac{1}{\lambda}\right) \cdot \delta = \frac{\Delta\lambda}{\lambda_0^2} \cdot \delta \quad (7)$$

where $\Delta\lambda$ represents the wavelength excursion without mode jumping of a conventional laser diode.

It should be emphasized here that the number N is not necessarily an integer. It is proportional to the path difference $\delta$. It is a useful working parameter because it is normalized in relation to the modulation frequency $1/T$.

Knowing the characteristics of the laser diode used, that is to say $\Delta\lambda$ and $\lambda_0$, measuring N (number of oscillations per half-period of the triangular modulation) makes it possible to determine the path difference $\delta$.

For our application, the glass can be regarded as a reflection interferometer. If light is incident on a pane of glass, it will be reflected by the two faces of the glass. These two reflections interfere with a path difference:

$$\delta = 2ne \quad (8)$$

where n and e respectively represent the refractive index and the thickness of the glass.

By measuring the path difference $\delta$, and knowing the refractive index n of the glass, the thickness e can be deduced. In contrast to the relative measurement method which will be set out in the paragraph below, the measurement taken is an absolute measurement.

If a more in-depth analysis of equation (5) is made, it can be seen that the signal has not only an angular frequency $\omega$ which is proportional to the thickness, but also a phase $\phi_0$ which is proportional to the path difference $\delta$, and therefore to the thickness e (see equation (3-1)).

Measuring the angular frequency $\omega$ or N allows us to determine the thickness e of the glass. At the same time, measuring the phase variation gives us access to information about the variation in thickness.

For measurement k and measurement k+1, which are two successive measurements, if the sensor is moved relative to a sample of glass, the corresponding thicknesses are respectively $e_{(k)}$ and $e_{(k+1)}$ and the corresponding phases are respectively $\phi_{0(k)}$ and $\phi_{0(k+1)}$. The following is obtained:

$$\varphi_{0(k)} = \frac{2}{0}2ne_{(k)} \text{ and } \varphi_{0(k+1)} = \frac{2}{0}ne_{(k+1)}$$

The phase shift is given by:

$$\Delta\varphi_{(k)} = \varphi_{0(k+1)} - \varphi_{0(k)} = \frac{2\pi}{\lambda_0}2n \cdot \Delta e_{(k)} \quad (9)$$

with:

$$\Delta e_{(k)} = (e_{(k+1)} - e_{(k)}) \quad (10)$$

It should be recalled that $\lambda_0$ is the wavelength of the laser diode without modulation, and is therefore a fixed parameter. Knowing the refractive index n of the glass, measuring the phase shift allows us to determine the thickness variation $\Delta e_{(k)}$ at measurement k according to equation (9).

For a phase shift of 10°, which is readily measurable, if the index of the glass is 1.52 and the wavelength $\lambda_0$ 780 nm, the thickness variation is 7 nm. The method therefore has a capacity for measuring thickness variations which is better than 10 nm, i.e. $1.10^{-8}$ m. This capacity allows us to measure the dioptric defects of float glass, for example.

The invention is based on the principle which has just been explained.

In a variant, instead of a conventional laser diode it uses a DBR laser diode (Distributed Bragg Reflector—See T. HIRATA, M. MAEDA, M. SUEHIRO, H. HOSOMATSU "Fabrication and Characterisation of GaAs-AlGaAs Tunable Laser Diodes with DBR and Phase-Control Sections Integrated by Compositional Disordering of a Quantum Well", IEEE JOURNAL OF QUANTUM ELECTRONICS, VOL. 27, N° 6, JUNE 1991).

For a typical conventional laser diode with $\lambda_0=780$ nm and $\Delta\lambda=0.24$ nm, the following is obtained for e=1 mm:

N=1.2

A typical DBR laser diode has the following characteristics: $\lambda_0=850$ nm and $\Delta\lambda=2$ nm, and the following is obtained for e=1 mm:

N=8.4

It may be noted that by using a DBR laser diode, even for a thickness of 0.5 mm, there are still more than 4 oscillations for taking a frequency measurement in order to determine the thickness, which is quite comfortable. It is therefore possible to measure the thickness of glass which is thin or even ultra thin (0.2 mm).

It should, however, be emphasized that unlike with the conventional laser diode, the wavelength modulation of a DBR laser diode is not linear for a linear modulation of the current. In other words, the function $g_0(t)$ in expression (2) is a non-linear function of time for a DBR laser diode.

In general, the interference signal can be represented by:

$$V_{int} I_0(1+C\cdot\cos(\phi_0+e\cdot g(t))) \quad (11)$$

with:

$$g(t)=b_1 t+b_2 t^2+b_3 t^3+\ldots \text{ for DBR laser diode} \quad (12)$$

and:

$$g(t) = \left(2\pi\cdot\Delta\left(\frac{1}{\lambda}\right)\frac{2n}{T/2}\right)t \text{ for conventional laser diode} \quad (13)$$

Figure 1:
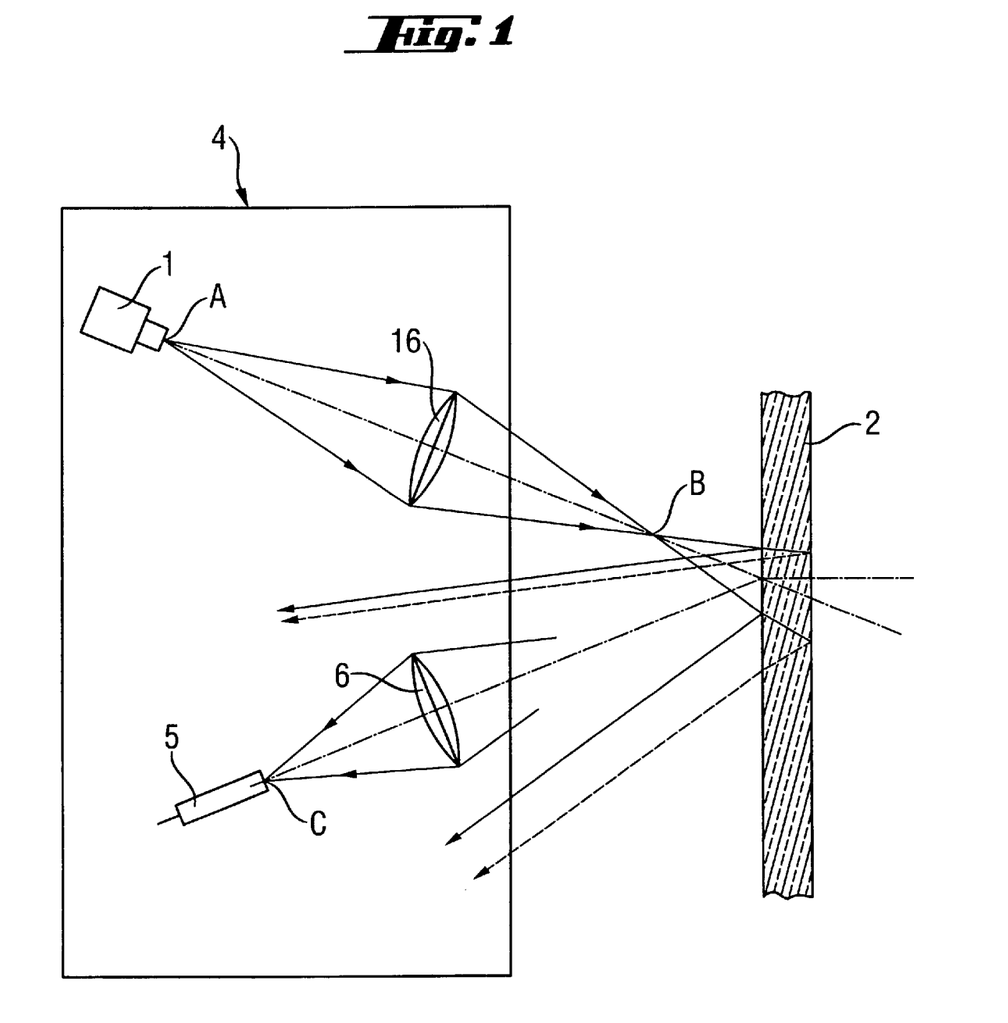
FIG. 1 shows the optical principle of the measurement device.

FIG. 1 presents the optical system in a schematic form.

Figure 2:
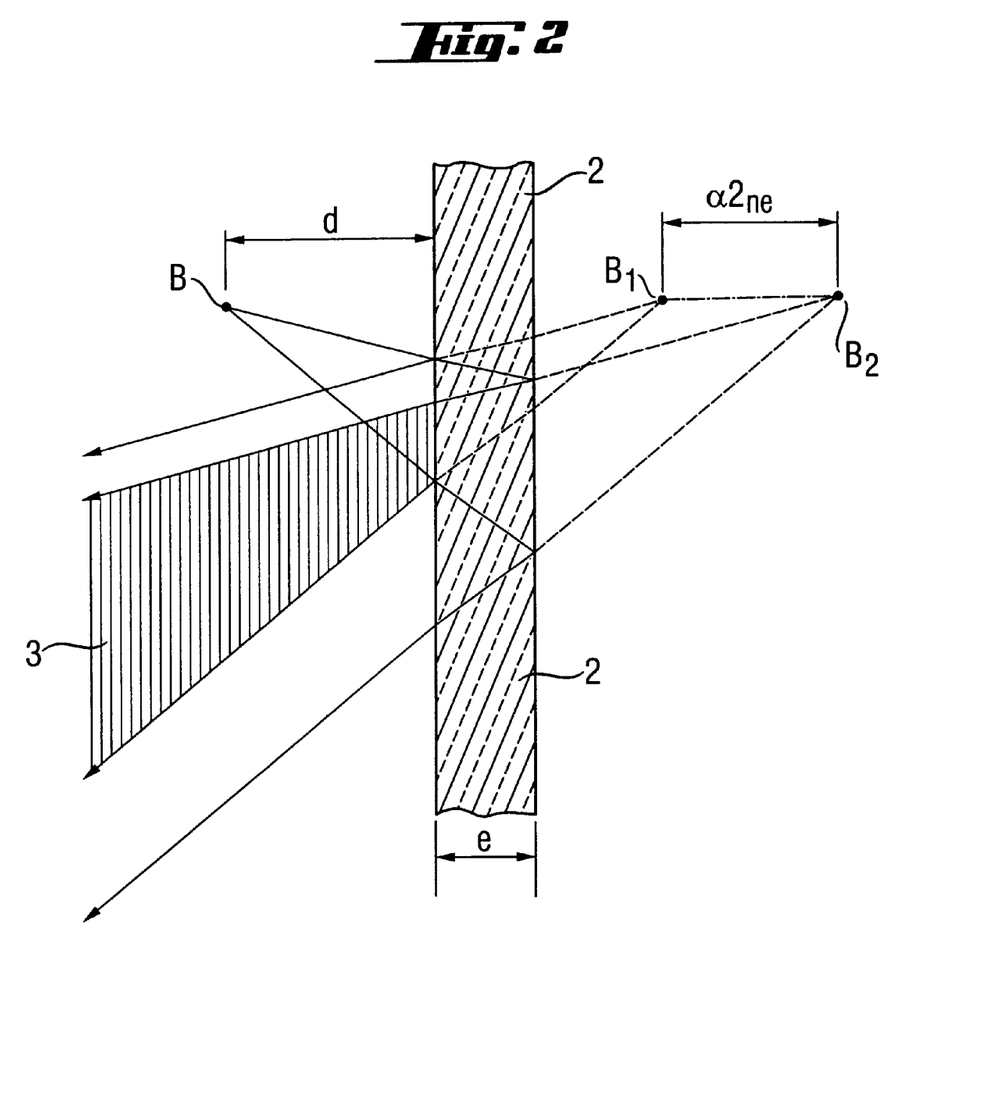
FIG. 2 represents the interference zone of plane glass with parallel faces.

The light source, a conventional laser diode or DBR laser diode, is shown at 1. The image of its output A is formed at B by a lens 16. The position of the point B in relation to the sample of glass 2 is not arbitrary. The fact that this new light source gives a divergent beam in the glass makes it possible to obtain a sizeable interference zone, represented at 3 in FIG. 2, even in the case when the glass is prismatic, which can reduce the aperture of the zone 3. The detection part of the signal is thus not at risk of being outside the zone where the measurement is possible, even in the very prismatic parts of a strip of float glass, at the edges.

The light sources used in the tests were either a conventional laser diode HL 7851 G (Hitachi) with a power of 50 mW and a wavelength $\lambda$ of 780 nm, or an 852 nm Yokogawa YL 85 XT DBR laser diode.

In order to avoid excessive heating of the optoelectronic systems, a variant of the invention proposes that optical fibres be employed when using the method of the invention in hot production zones. The light from a laser diode is then coupled into a single-mode optical fibre, which is not represented in the figures.

The light rays output from the secondary source B are reflected by the two surfaces of the sample (specular reflection which gives an intensity much greater than that of rays scattered by the surfaces as in the prior art. The invention is, however, also compatible with scattered rays).

Figure 3:
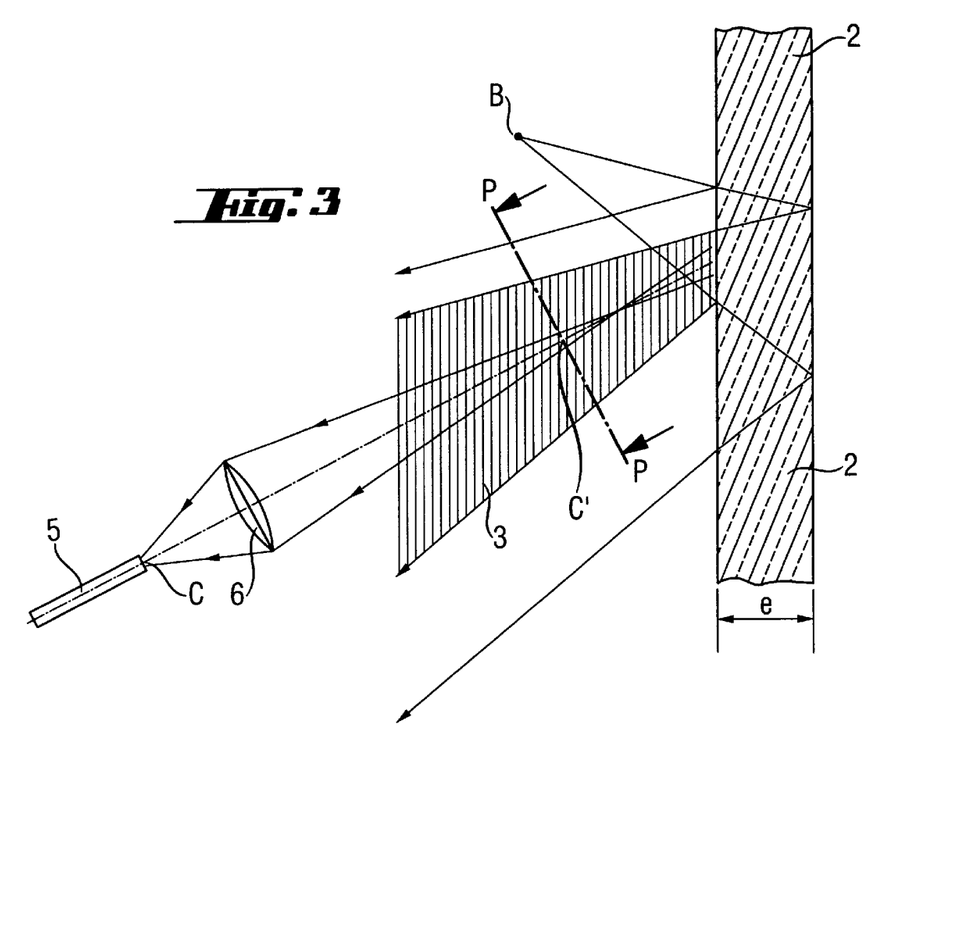
FIG. 3 represents the same zone with the reception lens; for its part.

The reflected beams seem to come from two point sources $B_1$ and $B_2$ (FIG. 2), the distance between them being proportional to the thickness e of the sample, which is what is actually to be measured. For the measurement, the emission side and the reception side of the system are combined in FIG. 1, the rectangle 4 containing all of the device according to the invention. In addition to the emission part described above, the reception part therefore also lies in it. There is thus a lens 6 which focuses at C an element C' of the interference zone 3, either directly onto the detection component or, as in FIGS. 1 and 3, onto the input of a multi-mode optical fibre 5. The optical fibre is connected to a detector; an avalanche photodiode (APD) is advantageously used.

Figure 4:
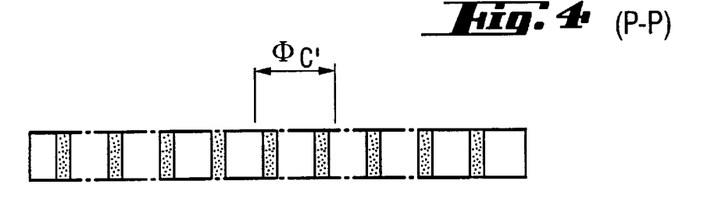
FIG. 4 shows the interference fringes in a plane P of the said interference zone.

FIG. 4 represents a section of the interference zone 3 at the point C' picked up by the lens 6. The indication $\Phi_{C'}$ represents what is actually "seen" by the lens 6 and the optical fibre 5.

Figure 5:
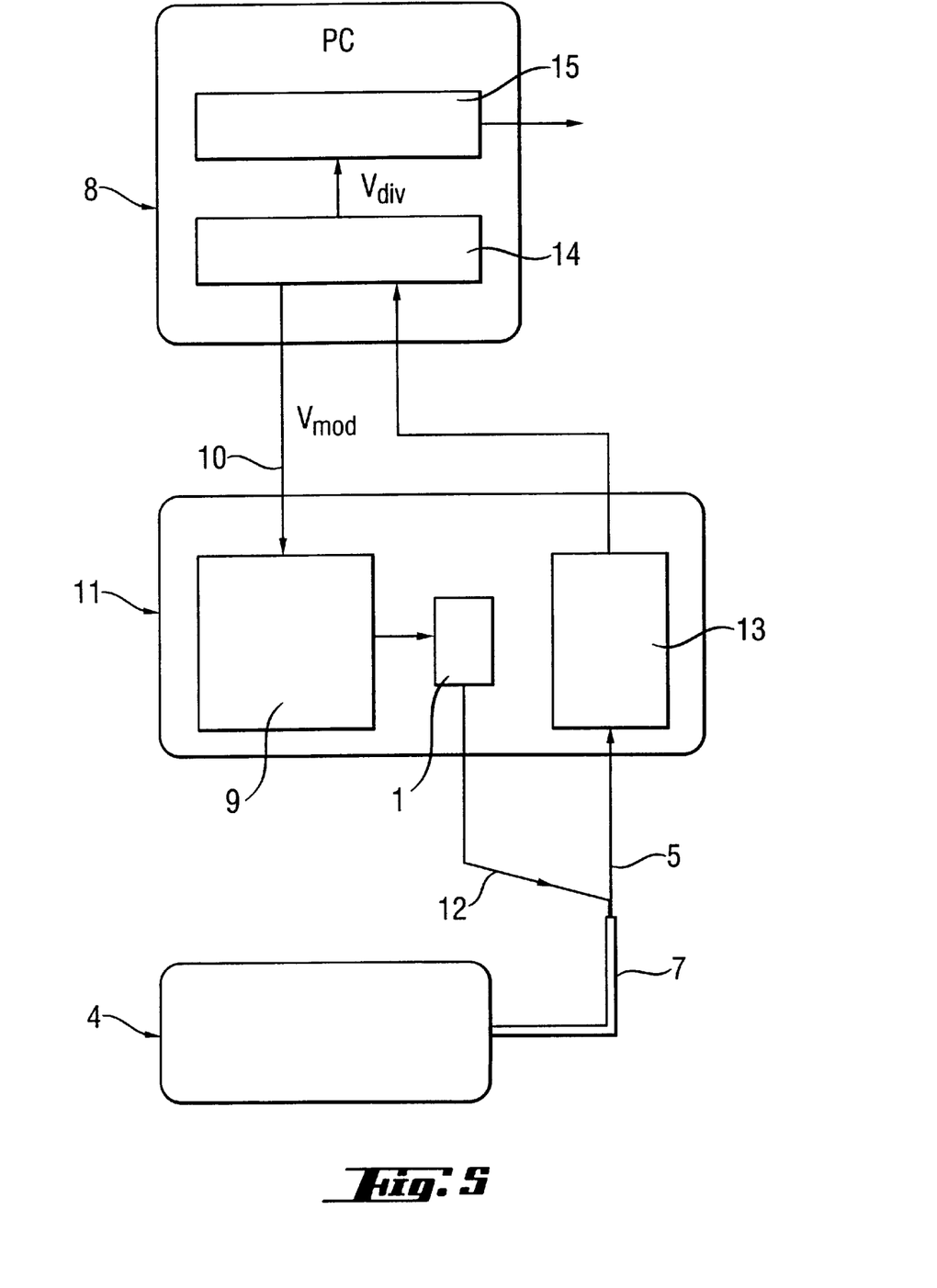
FIG. 5 presents a schematic view of the electronic device for processing the optical signal.

The measurement system is represented in FIG. 5. What is essential is a computer 8, for example a PC, which manages the optoelectronic devices and analyses and processes the detected optical signal. The light source 1, a conventional or DBR laser diode lying inside the electronics unit 11, is powered by a power supply unit 9. The latter receives a modulation signal $V_{mod}$ from the computer 8 via the cable 10. The optical signal output by the laser diode 1 is transmitted by the single-mode optical fibre 12 which runs through a sheath 7 as far as the measurement head 4. The multimode other optical fibre 5 which passes through the same sheath 7 collects the optical signal at C and transmits it to the detector 13, which is preferably an avalanche photodiode.

The PC system is in fact a signal processing system. It comprises:

a divider card, digital signal processing software.

These two parts will be dealt with in more detail in the next paragraph.

The heterodyne interferometry method uses linear current modulation to modulate the laser diode wavelength. The laser diode light intensity is, however, also time-modulated.

Re-examining expression (11), which applies for a conventional laser diode and also for a DBR laser diode, it can be seen that if the intensity $I_0$ is time-modulated in any way, it will not be possible to extract the terms (angular frequency and phase) of the sinusoidal signal.

For a conventional laser diode, a linear current modulation leads to a linear modulation of the intensity $I_0$. In the case of a DBR laser diode, however, a linear current modulation leads to a non-linear modulation of the intensity $I_0$.

The solution to this problem consists in dividing the interfering signal by the intensity modulation $V_{mod}=I_0(t)$. In this case, the followings obtained:

$$V_{div} = \frac{V_{int}}{V_{mod}} \propto 1 + C\cdot\cos(\varphi_0 + e\cdot g(t)) \quad (14)$$

with:

$$g(t)=b_1 t+b_2 t^2 +b_3 t^3+\ldots \text{ for DBR laser diode} \quad (15\text{-}1)$$

and:

$$g(t) = \left(2\pi\cdot\Delta\left(\frac{1}{\lambda}\right)\frac{2n}{T/2}\right)t \text{ for conventional laser diode} \quad (15\text{-}2)$$

The division signal obtained is independent of the modulation of the laser diode intensity. It is now only a pure sinusoidal signal, which allows us to utilize it and determine the thickness.

In the specific case of the sensor given, the division is performed digitally by a DIVIDER electronics card in PC format. Installed in a PC, it carries out the division and at the same time also provides the source of triangular modulation $V_{mod}$ for the laser diode power supply. This divider card is denoted 14 in FIG. 5.

The PC receives the division result transmitted by the DIVIDER. The digital processing can then begin in the unit 15.

For our application, the triangular modulation frequency may be 2 kHz. For a modulation rise or fall, 250 division points are available.

The first processing operation is band-pass filtering. This leads to elimination of some of the noise and the DC level of $V_{div}$, but without thereby deforming the sinusoidal signal.

The second processing operation consists in determining the positions of the extrema, that is to say the numerical indices (between 1 and 250) of maxima and minima in the sinusoidal signal. The last processing operation is for determining the thickness.

Figure 6:
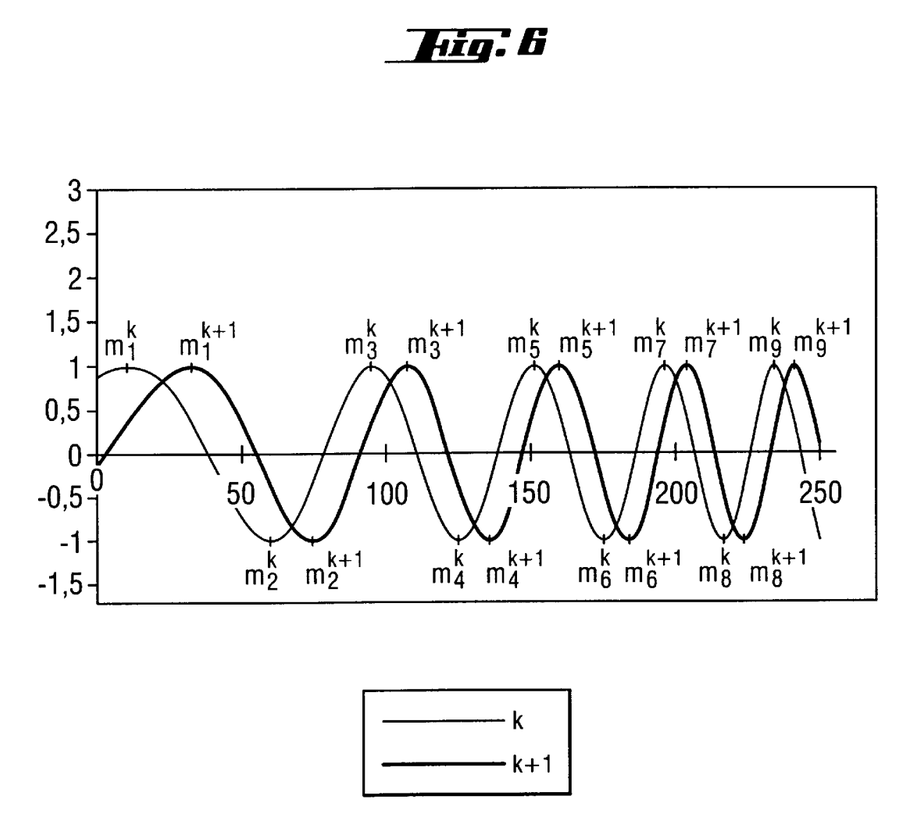
FIG. 6 shows the indexes of the extrema for two successive measurements (k and k+1) in the case of emission DBR laser diode.

For a rising or falling division signal $V_{div}$, the indices for the extrema can be expressed by a vector M. FIG. 6 shows these indices of the extrema for two successive measurements k and k+1. In this figure, a frequency modulation (concertina effect) can be seen, which corresponds to the case of a DBR laser diode. Nevertheless, this frequency modulation may represent the general case of the signal, both for a conventional laser diode and for a DBR laser diode.

For measurement k, a vector $M_k$ is obtained which contains L indices of the extrema:

$$M_k=[m_j{}^k]=[m_1{}^k, m_2{}^k, m_3{}^k, m_4{}^k, \ldots, m_L{}^k]$$

where:

$$1 < m_j{}^k < 250 \text{ and } 1 \leq j \leq L$$

In order to measure the thickness per se (absolute measurement), the following procedure is adopted.

Since the division signal is in digital form, the time term (t) loses its traditional meaning. The concept of time is replaced by an integer which varies from 1 to 250.

Knowing the function g(t) according to expression (14), the following is obtained:

$$e \cdot [g(m_{j+1}{}^k) - g(m_j{}^k)] = \pi \qquad (16)$$

This means that for the two successive extrema corresponding respectively to $t=m_j{}^k$ and $t=m_{j+1}{}^k$, the phase changes by π or 180°. Since for a given thickness and for a given laser diode there are L extrema, the thickness e can be determined in terms of least squares by minimizing the function below:

$$Y = \sum_{j=1}^{L-1} [e \cdot (g(m_{j+1}^k) - g(m_j^k)) - \pi]^2$$

The minimum of the function Y exists when dY/de=0, which gives:

$$e = \pi \frac{\sum_{j=1}^{L-1} (g(m_{j+1}^k) - g(m_j^k))}{\sum_{j=1}^{L-1} (g(m_{j+1}^k) - g(m_k^k))^2} \qquad (17)$$

This formula for determining thickness applies both for a conventional laser diode and for a DBR laser diode.

In order to carry out the measurement of thickness variations (relative measurement), it is necessary to calculate the derivative of the thickness profile.

For measurement k+1, the following is obtained:

$$M_{k+1}=[m_j{}^{k+1}]=[m_1{}^{k+1}, m_2{}^{k+1}, m_3{}^{k+1}, m_4{}^{k+1}, \ldots, m_L{}^{k+1}]$$

If vector $M_k$ from measurement k is recorded in the memory of the computer, the phase shift between measurement k+1 and measurement k is given by:

$$\Delta \varphi_{(k)} = \varphi_{0(k+1)} - \varphi_{0(k)} = 2\pi \frac{m_k^{k+1} - m_j^k}{m_{j+2}^{k+1} - m_j^{k+1}} \qquad (18)$$

This is true so long as $m_j{}^{k+1}$ and $m_j{}^k$ both correspond to the maximum or both to the minimum of a sinusoid.

Hence, if the thickness of the glass has not varied by more than $\lambda_0/(4n)$, the thickness variation between the measurement k+1 and measurement k is, according to expression (9):

$$\Delta e_{(k)} = \Delta e_{(k+1)} - \Delta e_{(k)} = \frac{\lambda_0}{2n} \frac{\Delta \varphi_{(k)}}{2\pi} \qquad (19)$$

This formulation for determining the derivative of the thickness profile applies both for a conventional laser diode and for a DBR laser diode.

All that remains is to combine the calculation mode for the "absolute" thickness with that for the "relative" thickness in order to obtain a complete unique result.

The thickness profile can be given by:

$$e_{(k)} = e_{(1)} + \Delta e_{(k)} \qquad (20)$$

with:

$$\Delta e_{(k)} = \sum_{j=2}^{k} \Delta e_{(j-1)} \qquad (21)$$

where $e_{(1)}$ denotes the thickness at the first measurement (k=1). Here, k designates the measurement number and naturally represents time.

The relative measurement mode makes it possible to obtain the thickness variation profile $\Delta e_{(k)}$ with sub-micron precision. All that remains to be done in order obtain the final thickness profile is to find the constant $e_{(1)}$.

The absolute measurement mode allows us to determine $e_{(1)}$. In order to do this, it is sufficient to take one measurement in absolute mode before the relative measurements. In practice, however, one measurement taken at random is not stable, in view of the phenomena perturbing the signal during the measurement.

One of the remedies to this problem is to take the average of a certain number of measurements in absolute mode, which directly gives the constant $e_{(1)}$. However, the thickness variation of the product may not always allow enough time to make a large number of measurements and take their average. It seems to us that the best solution consists in determining the constant $e_{(1)}$ by the least squares method.

For a thickness profile measurement, a thickness profile in absolute mode is obtained at M measurement points:

$$e_{A(k)} \text{ for } k=1 \text{ to } M$$

The thickness variation profile at M measurement points is thus obtained in relative mode:

$$\Delta e_{(k)} \text{ for } k=1 \text{ to } M$$

Here, k=1 and k=M correspond respectively to the start and the end of the profile.

It is necessary to find the constant $e_{(1)}$ such that $[e_{(1)} + \Delta e_{(k)}]$ is as close as possible to $e_{A(k)}$ in terms of least squares. The constant $e_{(1)}$ can therefore be determined by minimizing the following function:

$$Q = \sum_{k=1}^{M} [(e_{(1)} + \Delta e_{(k)}) - e_{A(k)}]^2$$

The minimum of this function exists for $dQ/de_{(1)}$, which leads $$e_{(1)} = \frac{1}{M} \sum_{k=1}^{M} (e_{A(k)} - \Delta e_{(k)}) \quad (22)$$

To summarize, it may be stated that the thickness profile on a float line can be measured in the following way:

1) the measurements are taken while the sensor is moving transversely over the strip,
2) the absolute and relative measurements are taken for all the measurement points on the strip, which gives us the thickness profile $e_{A(k)}$ in absolute mode and the thickness variation profile $\Delta e_{(k)}$ in relative mode,
3) the final thickness profile is $[e_{(1)}+\Delta e_{(k)}]$ where $e_{(1)}$ is determined by expression (22).

In order to verify the method of the invention, various tests were carried out.

Figure 7:
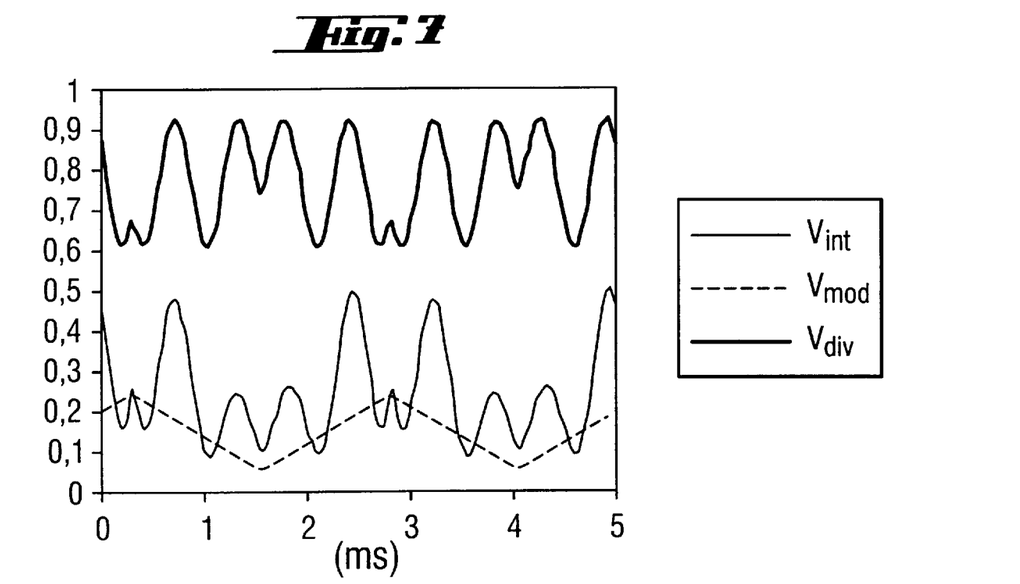
FIG. 7 and FIG. 8 represent the signals $V_{int}$, $V_{mod}$ and $V_{div}$ with a conventional laser diode, respectively for 1.67 mm and 3.83 mm.
Figure 8:
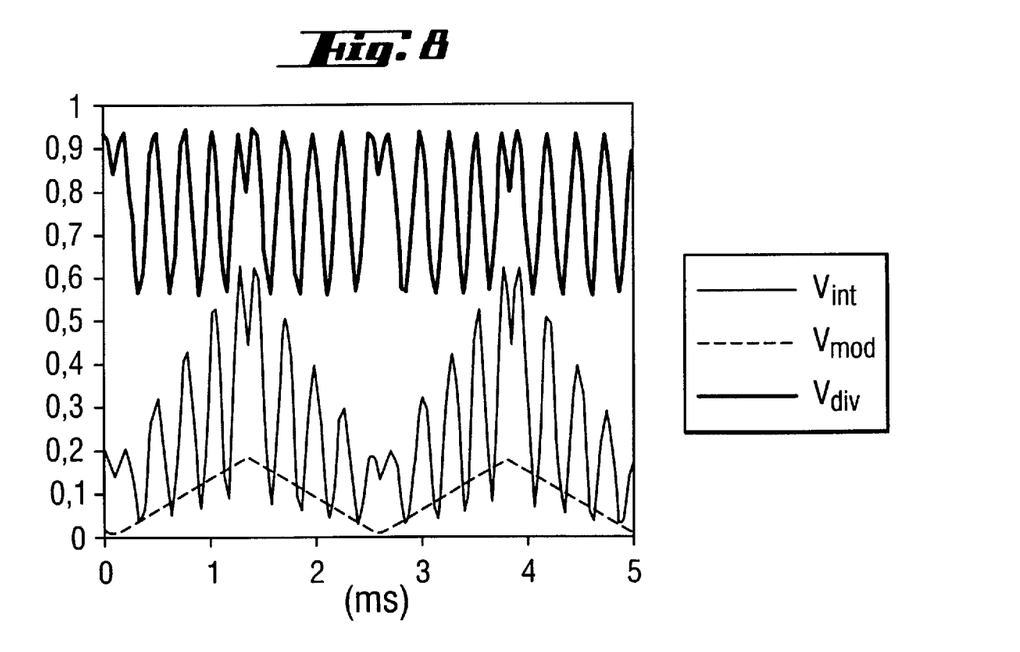

First, a measurement series was taken using a conventional laser diode, on flat glasses with various thicknesses between 1 mm and 20 mm. FIG. 7 shows the interference signal $V_{int}$, the modulation signal $V_{mod}$ and the division signal $V_{div}$ for a thickness of 1.67 mm and FIG. 8 for a thickness of 3.83 mm.

The method shows measurement precision of the same order as that of a micrometer screw gauge, ±5 μm.

Figure 9:
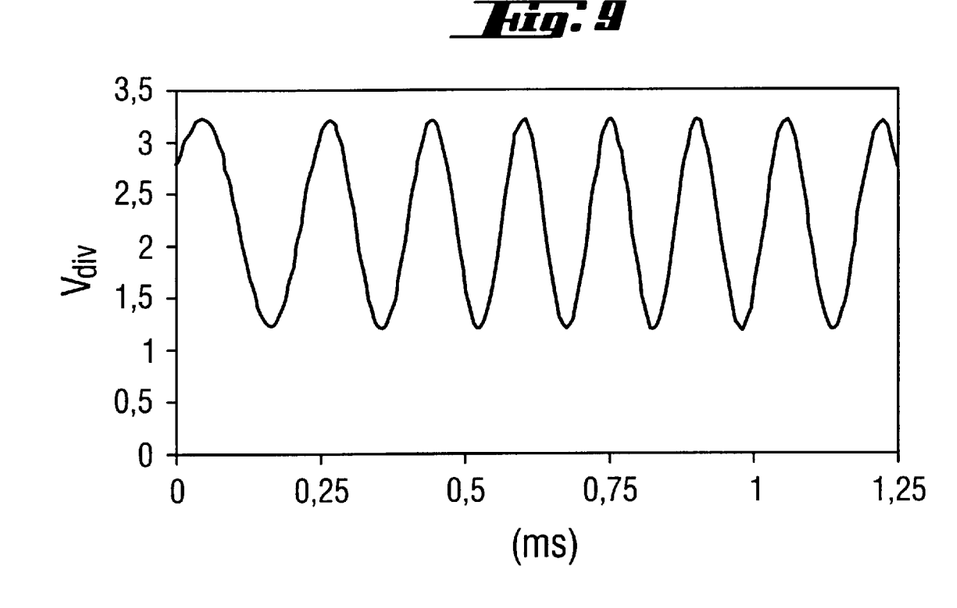
FIGS. 9 and 10 represent, for a DBR laser diode, the division signal during the modulation rise, respectively for flat glass with thickness 1.67 mm and 3.83 mm.
Figure 10:
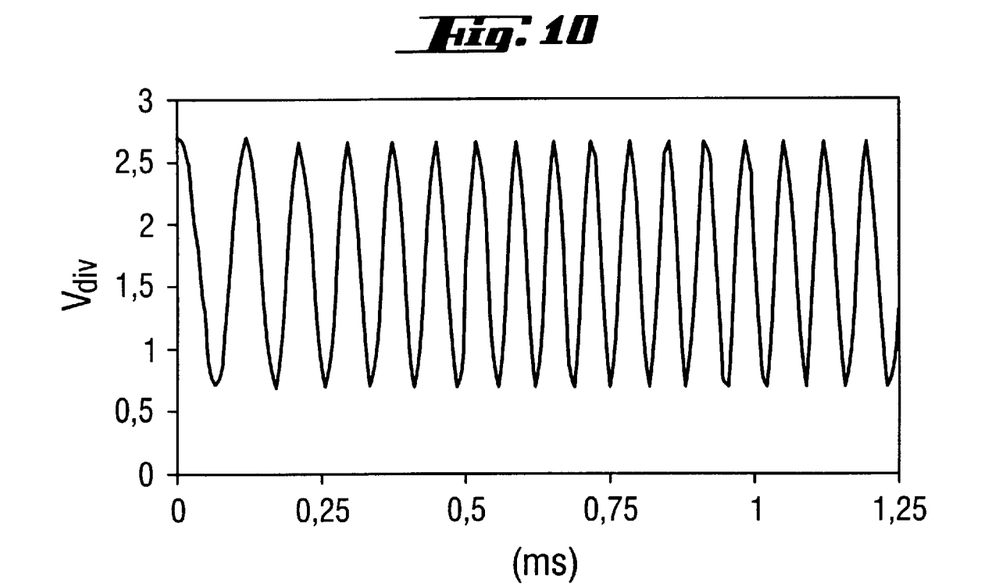

Using a DBR laser diode, a series of measurements was taken on flat glasses with various thicknesses between 0.3 mm and 5 mm. FIG. 9 and FIG. 10 show the signals for a thickness of 1.67 mm and a thickness of 3.83 mm.

Comparing FIGS. 7 and 9, it is easy to see that during a rise (or fall) of the triangular modulation, for the same thickness, there are many more oscillations with a DBR laser diode than with a conventional laser diode. At the same time, the concertina effect on the division signal obtained with the DBR laser diode is clearly visible, which reflects the nonlinearity of the function g(t) for the DBR laser diode.

The measurement of thickness with a DBR laser diode requires, above all, accurate knowledge of the function g(t), that is to say the nonlinearity of wavelength modulation by linear current modulation. This function can be determined by mathematical fitting. This consists in determining all the parameters in the following expressions:

$$V_{div} = \frac{V_{int}}{V_{mod}} \propto 1 + C \cdot \cos(\varphi_0 + e \cdot g(t))$$

with:

$$g(t)=b_1 t+b_2 t^2+b_3 t^3+ \ldots \text{ (°/mm) for t=1 to 250}$$

so that the mathematical division signal above is as close as possible to the experimental one in terms of least squares. With the experimental division signal for a thickness of 1.67 mm (see FIG. 9), the following is obtained for a given DBR laser diode:

$b_1=3.57897, b_2=0.022936, b_3=4.81\ 10^{-5}$ and $b_n=0$ for n>3

Knowing the function g(t), the thickness of the glass to be measured can be determined by expression (17).

Figure 11:
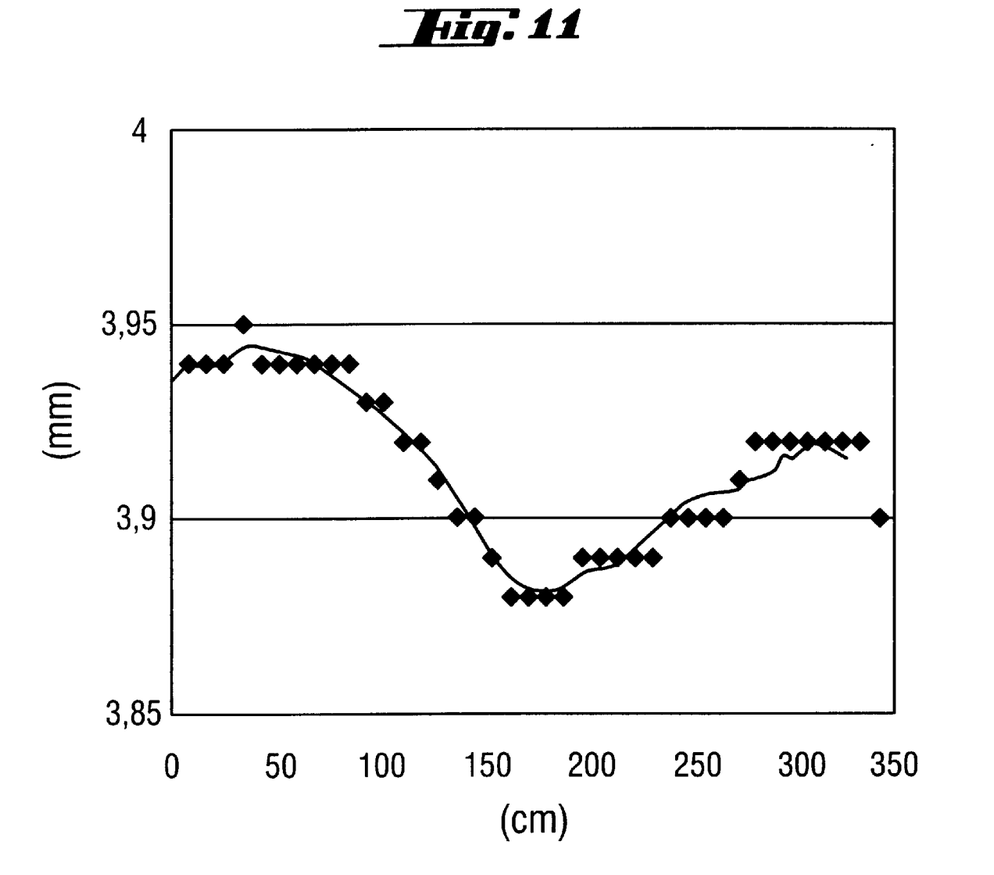
FIG. 11 shows a thickness profile measured according to the invention in comparison with manual measurements.

FIG. 11 shows the experimental results of a measurement taken across the width of a strip of float glass which was moving while the device of the invention travelled across its width. The abscissa shows the width of the strip, from 0 to 350 cm, and the ordinate shows the thickness in mm. The diamond points represent the measurements taken with a micrometer screw gauge. It can be seen that the precision of the measurement according to the invention is better since it is possible to interpolate between two manual measurements taken to one hundredth of a millimetre.

The invention thus makes it possible to monitor the thickness of the float glass during production with excellent precision. By virtue of the invention, it is also possible to take this measurement at high temperatures, that is to say before the glass enters the annealing lehr. The process controllers can then react to the production parameters straight away, which greatly limits waste and, in general, improves quality.

What is claimed is:

1. A process for measuring the thickness (e) and thickness variation ($\Delta e$) between opposite surfaces of a transparent material with refractive index (n), comprising the steps of:

focusing a light beam with a modulated optical frequency on the transparent material so that the beam reflects off the surfaces of the transparent material to create an interference signal;

determining the number of oscillations per modulation period of the interference signal;

determining the phase shift ($\Delta\varphi$) of the interference signal; and calculating the path difference ($\delta$) between the two beams and the thickness (e) of the transparent material, and calculating the local thickness variations of the transparent material, wherein calculating the local thickness variation comprises:

obtaining the interference signal on a detector;

obtaining the ratio of the interference signal to the modulation of the intensity;

band-pass filtering the ratio;

determining the extrema of the resultant signal for the measurement at time k;

determining the time between the corresponding extrema of two successive measurements (k and k+1);

calculating the ratio of the preceding times to the corresponding periods and multiplying it by 2 π to obtain the phase shift ($\Delta\varphi$); and calculating the thickness variation by the formula;

$$\Delta e = \frac{\lambda_0 \cdot \Delta\varphi}{4n\pi}$$

where $\lambda_0$ is the wavelength of the light beam without modulation.

2. The process according to claim 1 wherein the calculation of local thickness variations further comprises the step of digitizing the interference signal.

3. A process for measuring the thickness (e) between opposite surfaces of a transparent material with refractive index (n), comprising the steps of:

focusing a light beam emitted by a monochromatic source with a modulated optical frequency on the transparent material so that the beam reflects off the surfaces of the transparent material to create an interference signal;

determining the number of oscillations per modulation period of the interference signal;

determining the phase shift ($\Delta\varphi$) of the interference signal; and calculating the path difference ($\delta$) between the two beams and the thickness (e) of the transparent material.

4. The process according to claim 3, wherein the light beam is emitted by a laser diode with distributed Bragg reflector (DBR).

5. The process according to claim 3, wherein the light beams reflected by the surfaces of the transparent material are reflected by specular reflection.

6. The process according to claim 3, wherein the focused light beam converges before reaching the surfaces of the transparent material so that it is divergent when it reaches the surfaces of the transparent material.

7. The process according to claim 3, wherein the thickness measurement is obtained by:

digitizing the signal;

obtaining the ratio of the interference signal to the modulation of the intensity; band-pass filtering the ratio;

determining the extrema of the resultant signal for the measurement at time k;

determining the time between the corresponding extrema of two successive measurements (k and k+1);

conducting a least squares calculation with the function:

$$Y = \sum_{j=1}^{L-1} [e \cdot (g(m_{j+1}^k) - g(m_j^k)) - \pi]^2$$

where $m_j^k$ represents the positions of the extrema of the division signal for the measurements k, and g represents the frequency modulation of the light beam; and calculating the thickness by the formula:

$$e = \pi \frac{\sum_{j=1}^{L-1} (g(m_{j+1}^k) - g(m_j^k))}{\sum_{j=1}^{L-1} (g(m_{j+1}^k) - g(m_j^k))^2}.$$

8. The process according to claim 3, wherein the process is applied to the precise measurement of local thickness variations of a strip of float glass.

9. The process according to claim 8, wherein the process is applied to the measurement of dioptric defects of the float glass on the basis of the measurement of local thickness variations.

10. The process according to claim 3, wherein the thin transparent material is more than 0.2 mm thick.

11. A device for measuring the thickness (e) between opposite surfaces of a transparent material with a refractive index (n), comprising a light source having a modulated optical frequency, a lens for directing a light beams from the light source onto the surfaces of the transparent material, a light detector for receiving an interference signal of the beams reflected by the surfaces of the transparent material and a computer which performs the following steps:

digitizes the signals;

takes the ratio of the interference signal and the intensity modulation;

band-pass filters the digitized ratio;

determines the extrema of the resultant signal for the measurement at time k;

determines the extrema of the resultant signal for the measurement at time k;

determines the time between the corresponding extrema of two successive measurements (k and k+1);

solves a least squares calculation with the function:

$$Y = \sum_{j=1}^{L-1} [e \cdot (g(m_{j+1}^k) - g(m_j^k)) - \pi]^2$$

and calculates the thickness of the transparent material by the formula:

$$e = \pi \frac{\sum_{j=1}^{L-1} (g(m_{j+1}^k) - g(m_j^k))}{\sum_{j=1}^{L-1} (g(m_{j+1}^k) - g(m_j^k))^2}.$$

12. The device of claim 11, wherein the light source is a DBR laser diode, and the device further comprises a computer which performs the following steps:

digitizes the signals;

takes the ratio of the interference signal and the intensity modulation;

band-pass filters the digitized ratio;

determines the extrema of the resultant signal for the measurement at time k;

determines the time between the corresponding extrema of two successive measurements (k and k+1);

takes the ratio of the preceding times to the corresponding periods and multiplying it by 2 π to obtain the phase shift;

calculates the thickness variation by the formula:

$$\Delta e = \frac{\lambda_0 \cdot \Delta \varphi}{4n\pi}.$$

13. The device according to claim 11 or claim 12, further comprising a fibre-optic waveguide for transporting the light beams emitted by the light source.

14. The device according to claim 11 or claim 12, wherein the light detector is an avalanche photodiode.

* * * * *